US012614448B2

(12) United States Patent
Thibault

(10) Patent No.: US 12,614,448 B2
(45) Date of Patent: Apr. 28, 2026

(54) STATUS ALERT SYSTEM, METHOD AND APPARATUS FOR SECURITY SYSTEMS

(71) Applicant: Universal Electronics Inc., Scottsdale, AZ (US)

(72) Inventor: Thomas Thibault, Carlsbad, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 23 days.

(21) Appl. No.: 18/733,193

(22) Filed: Jun. 4, 2024

(65) Prior Publication Data

US 2025/0371971 A1 Dec. 4, 2025

(51) Int. Cl.

| | |
|---|---|
| ***G08B 29/04*** | (2006.01) |
| ***G08B 3/10*** | (2006.01) |
| ***G08B 5/36*** | (2006.01) |
| ***G08B 13/26*** | (2006.01) |
| ***G08B 29/16*** | (2006.01) |

(52) U.S. Cl.

CPC ............... *G08B 29/04* (2013.01); *G08B 3/10* (2013.01); *G08B 5/36* (2013.01); *G08B 13/26* (2013.01); *G08B 29/16* (2013.01)

(58) Field of Classification Search

CPC . G08B 29/04; G08B 3/10; G08B 5/36; G08B 13/26; G08B 29/16

See application file for complete search history.

(56) References Cited

U.S. PATENT DOCUMENTS

| | | | | |
|---|---|---|---|---|
| 6,002,427 | A | 12/1999 | Kipust | |
| 6,982,656 | B1 * | 1/2006 | Coppinger | G08G 1/202 340/988 |
| 7,120,795 | B2 * | 10/2006 | Raphael | G08B 25/003 713/168 |
| 9,978,258 | B2 * | 5/2018 | Lamb | G08B 13/08 |
| 11,126,256 | B1 * | 9/2021 | Gruber | H04W 52/028 |
| 2006/0226977 | A1 * | 10/2006 | DeLozier | G08B 25/012 340/541 |
| 2012/0019149 | A1 | 1/2012 | Shih | |
| 2016/0189532 | A1 | 6/2016 | Malhotra | |
| 2016/0301373 | A1 | 10/2016 | Herman | |
| 2020/0312104 | A1 | 10/2020 | Seelman | |

OTHER PUBLICATIONS

International Search Report and Written Opinion of application No. PCT/US25/31875, dated Jul. 25, 2025, 11 pp.

* cited by examiner

*Primary Examiner* — John A Tweel, Jr.

(74) *Attorney, Agent, or Firm* — Greenberg Traurig, LLP

(57) ABSTRACT

A barrier alarm device for reducing the occurrence of false alarms in a security system. A barrier alarm device receives a status message from a central security system controller indicating that a security system controlled by the central security system controller is in an armed-home state. In response to receiving the status message indicating that the security system is in an armed-home state, the barrier alarm device causes a status indicator of the barrier alarm to activate, thereby warning people inside a home or business that the security system is armed.

20 Claims, 3 Drawing Sheets

STATUS ALERT SYSTEM, METHOD AND APPARATUS FOR SECURITY SYSTEMS

BACKGROUND

I. Field of Use

The present application relates to the field of home security. More specifically, the present application relates to a barrier alarm device that helps reduce the occurrences of false alarms.

II. Description of the Related Art

Security systems for homes and businesses have been around for many years. Often, these systems make use of a number of barrier alarm devices such as door and window sensors. Door and window sensors typically comprise two distinct parts: a magnet and a reed switch/transmitter assembly. The reed switch/transmitter assembly is typically installed onto a stationary surface, such as a door or window frame, while the magnet is mounted to a movable portion of a door or window. When the door or window is closed, the magnet and reed switch are in close proximity to one another, maintaining the reed switch in a first state indicative of a "no alarm" condition. If the door or window is opened, proximity is lost between the magnet and the reed switch, resulting in the reed switch changing state, e.g., from closed to open or from open to closed. The change of state is indicative of a local alarm condition, and a signal may be generated by circuitry located within the reed switch assembly and sent, via wires or over-the-air, to a central security panel or gateway in the home, which may forward the signal to a remote monitoring station. In addition, a loud audible alert is typically generated, either at the central security panel in the home or directly by the circuitry within the reed switch assembly, indicating that a door or window has been opened.

One problem with security systems is the relatively frequent occurrence of false alarms. Most security systems offer a "home" arming feature which arms all door and window sensors, but does not arm any interior motion sensors. In this way, occupants are protected against intruders while being able to move about within the home without causing motion sensors to alarm. Often times, occupants forget that the security system is armed, and when they open a door or a window, a false alarm is triggered, and one or more very loud sirens may go off. These sirens are designed to scare away intruders, so they are jarring to unsuspecting occupants when they are activated. False alarms may also cause a response by police or fire personnel, wasting valuable public resources. Homeowners may also be fined by municipalities for too many false alarms. False alarms are the number one reason why people cancel security monitoring contracts.

It would be desirable to provide a warning to occupants to let them know when a security system is armed, in order to reduce false alarms.

SUMMARY

The embodiments described herein relate to methods, systems, and apparatus for providing a warning to occupants of a structure that a security system is in an armed-home state. In one embodiment, a barrier alarm device is described, comprising an internal barrier sensor, configured to detect when a barrier monitored by the barrier alarm device has been moved, a transceiver configured to transmit alarm signals and to receive security system status information, a non-transitory memory having processor-executable instructions stored thereon, a status indicator; and a processor, coupled to the internal barrier sensor, the transceiver, the memory and the status indicator, for executing the processor-executable instructions that cause the processor to monitor the internal barrier sensor, receive, via the transceiver, a status message from a security system controller, the status message indicating that a security system controlled by the security system controller is in an armed-home state, in response to receiving the status message indicating that the security system is in an armed-home state, cause the status indicator to activate, providing a warning that the security system is armed and cause an alarm signal to be transmitted by the transceiver when the internal barrier sensor indicates that the barrier has been moved.

In another embodiment, a method is described, performed by a barrier alarm device, comprising monitoring a barrier internal barrier sensor of the barrier alarm, receiving a status message from a security system controller, the status message indicating that a security system controlled by the security system controller is in an armed-home state, in response to receiving the status message indicating that the security system is in an armed-home state, causing the status indicator to activate, providing an alert that the security system is armed, and causing an alarm signal to be transmitted when the internal barrier sensor indicates that the barrier has been moved.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to barrier alarm devices, such as door or window sensors, that have a capability of reducing occurrences of false alarms. For the purpose of the discussions herein, the term "barrier alarm device" means any device used to monitor and report states, physical conditions, attributes, status, or parameters of an entrance/exit barrier such as a door, a window, a gate, etc. Examples of barrier alarm devices comprise door and window sensors, glass breakage detectors, light interruption detectors, etc.

Embodiments of a barrier alarm device described herein comprise an internal barrier sensor, a transceiver and a status indicator. In some embodiments, it may also comprise a human detection sensor. The barrier alarm device is capable of receiving security system status messages from a central security monitoring device, indicating a status of a security system, i.e., disarmed, armed-home, armed-away, armed-sleep, etc. When the barrier alarm device receives a status message from the central security monitoring device indicating that the security system is in an armed-home status, the status indicator of the barrier alarm device may be activated in order to warn a person inside that the security system is armed. This may prevent an occupant from opening a door or a window while the security system is in the armed-home state, thus avoiding a false alarm. In some embodiments, the status indicator is activated only when the security system is in the armed-home state and a human detection sensor determines the presence of a person inside the structure and in proximity to the barrier alarm device.

Figure 1:
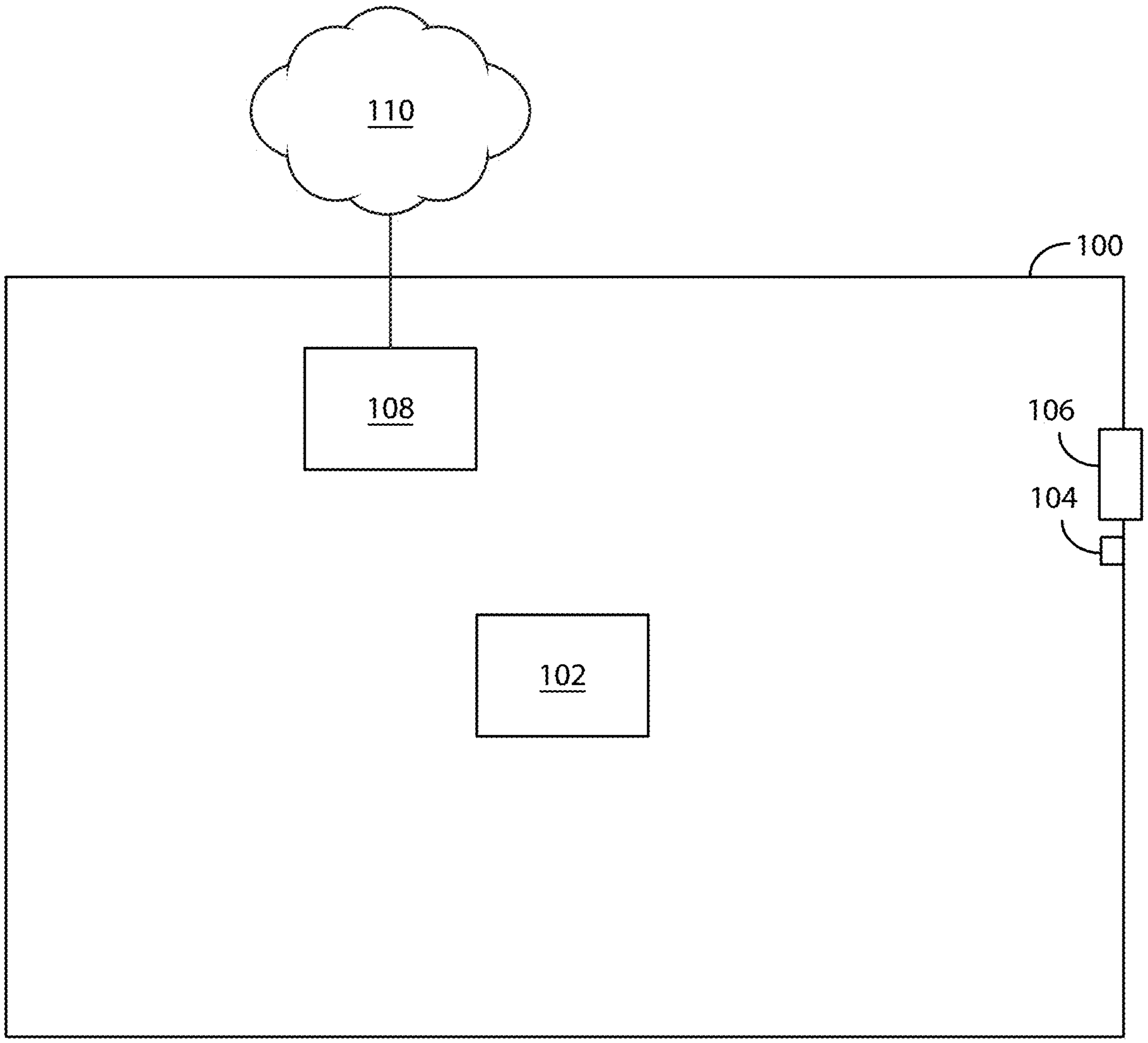
FIG. 1 is an illustration of structure monitored by a security system in accordance with one embodiment of the principles discussed herein.

FIG. 1 is a simplified, top, plan view of a structure 100 comprising a central security monitoring device 102 and barrier alarm device 104 (more commonly known as a "door sensor") for monitoring an entry door 106 of structure 100. Central security monitoring device 102 and barrier alarm device 104 may be referred to, collectively, as a "security system". While the security system in this example comprises central security monitoring device 102 and only a single barrier alarm device 104, in typical use, a security system usually comprises a plurality of sensors of different sensor types, such as a plurality of barrier alarm devices (i.e., door sensors, window sensors, garage door tilt sensors), glass break sensors, motion detectors, etc. Only barrier alarm device 104 is shown in this example for clarity.

Structure 100 may comprise a home or a business, an industrial facility, or some other structure where a security system may be present.

Barrier alarm device 104 may comprise a sensor that monitors door 106 to determine movement, such as when door 106 is opened or closed. Traditional door sensors usually comprise a reed switch and a magnet mounted in close proximity to each other, one on a door frame and one on the door itself. When a door is opened, the magnet and read switch become separated, and therefore the reed switch changes state due to the sudden lack of magnetic field produced by the magnet. Upon detection of movement, a traditional door sensor sends an alarm signal to central security monitoring device 102 indicating movement of door 106. Other types of barrier alarm devices are known, such as sensors that rely on shock, vibration or rotation to determine movement of an entry barrier. Unlike traditional barrier alarm devices, barrier alarm device 104 comprises a wireless receiver and a status indicator to warn persons inside structure 100 when the security system is in and armed-home state.

Figure 2:
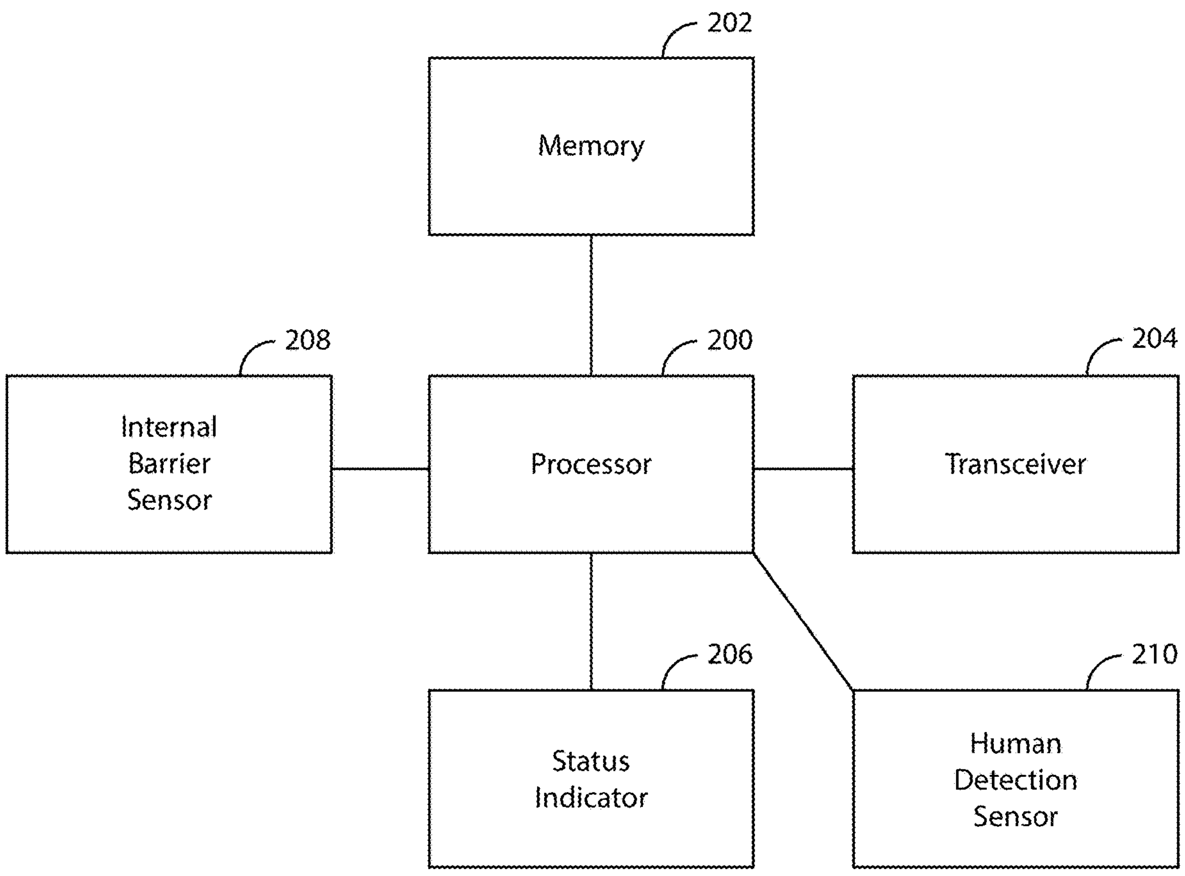
FIG. 2 is a perspective view of one embodiment of a barrier alarm device shown in FIG. 1.

FIG. 2 is a functional block diagram of one embodiment of barrier alarm device 104 in accordance with the teachings herein. Specifically, FIG. 2 shows processor 200, memory 202, transceiver 204, status indicator 206, internal barrier sensor 208 and optional human detection sensor 210. It should be understood that the functional blocks may be coupled to one another in a variety of ways, and that not all functional blocks necessary for operation of the barrier alarm device are shown (such as a power supply), for purposes of clarity.

Processor 200 is configured to provide general operation of barrier alarm device 104 by executing processor-executable instructions stored in memory 202, for example, executable code. Processor 200 typically comprises a microprocessor, microcomputer, or microcontroller particularly suited for a battery-operated sensor with a relatively small housing. Thus, selection of processor 200 is typically based on features such as low power consumption, small size, and low cost. In some embodiments, processor 200 is packaged alongside other components, such as in the case of a module or system on chip (SoC). An example of this is a Zwave series 800 SoC, part number ZG23 from Silicon Laboratories of San Jose, California.

Memory 202 comprises one or more information storage devices, such as RAM, ROM, EEPROM, flash, SD, XD, or other type of electronic, optical, or mechanical memory device. Memory 202 is used to store processor-executable instructions for operation of the barrier alarm device 104 as well as any information used by processor 200, such as a current status of a security system status. Memory 202 is non-transitory and excludes propagating signals. In some embodiments, memory 202 is packaged along with processor 200, for example, in an embodiment where processor 200 comprises a microcontroller or microcomputer.

Transceiver 204 is coupled to processor 200, comprising circuitry necessary to wirelessly transmit and receive wireless signals to and from central security monitoring device 102 and/or other security system sensors (such as in the case of a wireless mesh network). In another embodiment, transceiver 204 comprises circuitry necessary to send or receive signals to and from gateway 208 which, in turn, is coupled to wide-area network 110. Such circuitry is well known in the art and may comprise Bluetooth, Wi-Fi, RF, optical, ultrasonic circuitry, among others.

Status indicator 206 is coupled to processor 200, comprising one or more visual and/or audible devices and related circuitry, such as one or more LEDs, piezoelectric speakers, MEMs speakers, or some other light-emitting or miniaturized sound-creating device. Generally, status indicator 206 is selected to minimize a power drain from the battery in order to preserve as much battery life as possible. In some embodiments, status indicator 206 may be configured to point in a certain direction, such as downwards or sideways, depending on where barrier alarm device 104 has been installed. Pointing status indicator 206 in a certain direction may reduce or eliminate the visual warning from status indicator 206 for persons located away from barrier alarm device 104, but come into view or hearing range when a person approaches barrier alarm device 104.

Internal barrier sensor 208 is coupled to processor 200, comprising a sensor for monitoring or determining a state, physical condition, attribute, status, or parameter of a barrier of structure 100, such as a status (e.g., "open", "closed", "movement detected", etc.) of a door, window, gate, or other movable barrier of structure 100. 208 may comprise a reed switch, ultrasonic transducer/receiver, an infrared transmitter/receiver, an RFID receiver, a tilt sensor, an accelerometer, a gyroscope, a motion sensor, or some other device to determine a condition or status of a barrier.

Human detection sensor 210 is an optional component of barrier alarm device 104, coupled to processor 200, comprising a device or circuitry to detect a presence of a person inside structure 100 and in proximity to barrier alarm device 104. Examples of human detection sensor 210 include an ultrasonic transducer/receiver, an infrared transmitter/receiver, a capacitance sensor, an RF tank circuit, an RFID receiver, a micro motion detector, or some other circuitry or device able to detect the presence of a human being proximate to barrier alarm device 104. The term "proximate" to barrier alarm device 104 means that a person is between one foot and ten feet of barrier alarm device 104. Human detection sensor 210 is used in embodiments where status indicator 206 is energized when both the security system is in and arm-home state and a human is detected within proximity of barrier alarm device 104.

Figure 3:
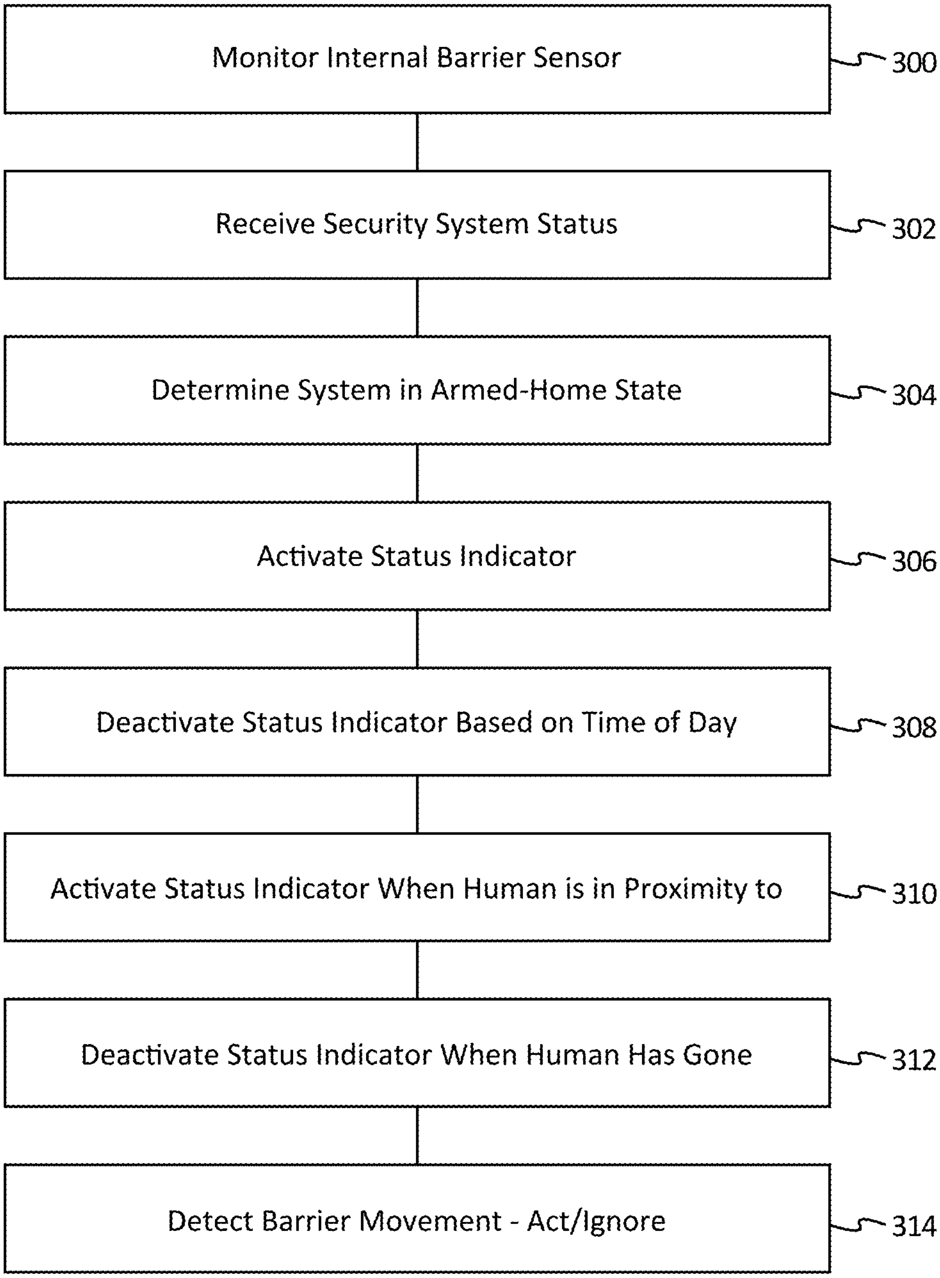
FIG. 3 is a flow diagram illustrating one embodiment of a method performed by the barrier alarm device shown in FIG. 2.

FIG. 3 is a flow diagram illustrating one embodiment of a method performed by a barrier alarm device as described herein, for providing a warning to inhabitants of structure 100 that a security system is in an armed-home state. It should be understood that in some embodiments, not all of the steps shown in FIG. 3 are performed. It should also be understood that the order in which the steps are carried out may be different in other embodiments.

At step 300, processor 200 monitors signals from internal barrier sensor 208 to determine whether a change of status of a barrier being monitored has changed. For example, if a door or a window has been opened. In an embodiment utilizing human detection sensor 210, in one embodiment, processor 200 does not monitor human detection sensor 210 until the security system is in an armed-home state.

At step 302, processor 200 receives security system status information via transceiver 204.

At step 304, processor 200 determines that the security system status information comprises a notification that the security system has entered into an armed-home state, where only perimeter security sensors are monitored by central security monitoring device 102, and any interior motion detectors are not monitored. The security system enters the armed-home state, typically by user interaction, i.e., by central security monitoring device 102 receiving an indication from a user to enter the armed-home state. This may be accomplished by entering a command to enter the armed-home state using a smart phone, computer or directly to central security monitoring device 102, for example, by using a keypad (not shown) coupled to central security monitoring device 102.

At step 306, in one embodiment, in response to determining that the security system has entered into an armed-home state, processor 200 activates status indicator 206. Activating status indicator 206 may comprise causing an LED to flash at a first predetermined rate, such as once every 10 seconds. The first predetermined rate may be based on several factors, including a desire to minimize the flash rate so that flash is minimally invasive to occupants of structure 100. It may also be based on a desire to conserve battery power, i.e., flashing at a higher rate drains more power from the battery than flashing at a lower rate. In another embodiment, processor 200 may cycle illumination of status indicator 206. For example, processor 200 may cause an LED to cycle at a predetermined rate from either no illumination or illumination at a very low luminance, ramping over time to a high luminance and back down to a very low luminance, or off. In yet another embodiment where status indicator 206 comprises a light-emitting device, processor 200 may cause status indicator 206 to activate continuously. For example, processor 200 may eliminate an LED at a particular brightness continuously.

In yet another embodiment, where status indicator 206 comprises an audio device, processor 200 may cause the audio device to emit one or more sounds, either continuously, at a varying volume and/or a varying rate. For example, if status indicator 206 comprises a piezoelectric speaker, processor 200 may cause the piezoelectric speaker to emit a continuous stream of audible “chirps” at a particular volume level at a predetermined rate. For example, a chirp may be emitted from the piezoelectric speaker at a rate of once every 10 seconds at a volume that can be heard within a predetermined distance from barrier alarm device 104, such as 10 feet or less. The predetermined distance is selected to minimize any disturbance that the chirp may have to people inside structure 100 that are not in proximity to barrier alarm device 104. As another example, processor 200 may cause the piezoelectric speaker to emit a continuous sound, such as a tone, at a predetermined distance, as explained above.

In one embodiment, when status indicator 206 comprises both a visual device and an audio device, processor 200 may cause both devices to activate, thus providing both a visual and audio warning to a nearby person inside structure 100 that the security system is in an armed-home state.

At step 308, in one embodiment, in order to save battery life, processor 200 may deactivate status indicator 204 based on a time of day. For example, processor 200 may deactivate status indicator 204 during the hours of 10 am until 6 pm, when people are normally awake and have left structure 100 for work, school, etc. As another example, processor 200 may deactivate status indicator 204 between 12 am and 6 am, when people are typically asleep. In this embodiment, processor 200 monitors an onboard software clock to determine the current time, and deactivates status indicator 204 when the current time is within one or more predetermined time periods.

At step 310, in an embodiment where barrier alarm device 104 comprises human detection sensor 210, processor 200 may activate status indicator 206 based on both the status of the security system being in the armed-home state as well as detection of a human in proximity to barrier alarm device 104. This embodiment maximizes battery life and minimizes disruptions to persons inside structure 100, as the visual and audio warnings described above are only activated when a person is in proximity to barrier alarm device 104.

For example, after processor 200 has received security system status information from central security monitoring device 102 indicating that the security system is in an armed-home state, processor 200 does not immediately activate status indicator 206. Rather, in one embodiment, processor 200 may begin to monitor human detection sensor 210 to determine whether a human is in proximity to central security monitoring device 102. This may be achieved by sensing motion or receiving a reflected infrared or ultrasonic return signal by human detection sensor 210. When processor 200, via human detection sensor 210, determines that a human is in proximity to barrier alarm device 104, processor 200 causes status indicator 206 to activate, in one or more of the ways described above. In one embodiment, processor 200 varies activation of status indicator 206 based on the distance that a person is from barrier alarm device 104. For example, processor 200 may determine, via human detection sensor 210, that a person has been detected at a distance of 10 feet from barrier alarm device 104. In response, processor 200 may cause an LED to begin flashing at a first predetermined rate. As the person continues to approach barrier alarm device 104, processor 200 may continue to determine an estimated distance that the person is away from barrier alarm device 104. For example, when the person approaches within five feet of barrier alarm device 104, processor 200 may alter the flash rate of the LED to a second predetermined rate faster than the first predetermined rate in an effort to attract a person’s attention. Similarly, when status indicator 206 comprises an audio device, processor 200 may cause the audio device to begin emitting a sound at a first predetermined volume and then increase the volume as processor 200 determines that the person is continuing to approach barrier alarm device 104. In either example, processor 200 may alter a characteristic of the visual and/or audible warning either in discrete steps (as just described) or on a continuous basis, i.e., a flash rate or volume change increasing continuously as a person gets closer to barrier alarm device 104.

At step 312, continuing with the embodiment where human detection sensor 210 is used and after a human has been detected in proximity to barrier alarm device 104, processor 200 may determine when the person is retreating from barrier alarm device 104. For example, when processor 200 determines that the previously-detected person is a greater distance away from barrier alarm device 104 then measured previously, processor 200 may either deactivate status indicator 206, or change a characteristic of the visual and/or audible warning, to reduce the urgency of the warning. After determining that the person has moved a predetermined distance away from barrier alarm device 104, processor 200 may deactivate status indicator 206, and continue to monitor human detection sensor 210.

At step 314, in some embodiments, if the warning emitted by status indicator 206 is not effective, and a human opens door 106, processor 200 may transmit an alarm signal to central security monitoring device 102 or gateway 108, indicating that door 106 has been opened. In response, central security monitoring device 102 or a back-end security server (not shown) via gateway 108, may cause one or more actions to occur, such as to sound a security siren (not shown) or to contact a remote monitoring center (not shown) indicating that an alarm has occurred at structure 100. Alternatively, when door 106 is opened and processor 200 has determined that a human is in proximity to barrier alarm device 104 inside structure 100, processor 200 may ignore alarm signal sent from barrier alarm device 104 as described in U.S. Pat. No. 9,940,797, assigned to the assignee of the present application and incorporated by reference herein.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A barrier alarm device, comprising:

an internal barrier sensor, configured to detect when a barrier monitored by the barrier alarm device has been moved;

a transceiver configured to transmit alarm signals and to receive security system status information;

a non-transitory memory having processor-executable instructions stored thereon; a status indicator; and a processor, coupled to the internal barrier sensor, the transceiver, the memory and the status indicator, for executing the processor-executable instructions that cause the processor to:

monitor the internal barrier sensor;

receive, via the transceiver, a status message from a security system controller, the status message indicating that a security system controlled by the security system controller is in an armed-home state;

in response to receiving the status message indicating that the security system is in an armed-home state, cause the status indicator to activate, providing a warning that the security system is armed; and cause an alarm signal to be transmitted by the transceiver when the internal barrier sensor indicates that the barrier has been moved.

2. The apparatus of claim 1, wherein the status indicator comprises a light-emitting device, wherein the processor-executable instructions that cause the processor to activate the light-emitting device comprises instructions that causes the processor to:

cause the light-emitting device to flash at a first predetermined rate.

3. The apparatus of claim 1, wherein the status indicator comprises a sound-emitting device, wherein the processor-executable instructions that cause the processor to activate the sound-emitting device comprises instructions that causes the processor to:

cause the sound-emitting device to emit a chirp.

4. The apparatus of claim 1, further comprising a timer, wherein the processor-executable instructions comprise further instructions that causes the processor to:

determine a current time of day from the timer; and activate the status indicator only when the security system is in the armed home state and the current time of day is within a predetermined time period.

5. The apparatus of claim 1, further comprising:

a human detection device coupled to the processor for determining when a human being is in proximity to the barrier;

wherein the processor-executable instructions comprise further instructions that causes the processor to:

detect, via the human detection device, that the human being is in proximity to the barrier; and cause the status indicator to activate only when the security system is in the armed-home state and the human detection device indicates that the human being is in proximity to the barrier.

6. The apparatus of claim 5, wherein the processor-executable instructions comprise further instructions that causes the processor to:

determine that the human being is closer to the barrier than from when the human being was initially detected; and in response to determining that the human being is closer to the barrier than from when the human being was initially detected, alter a characteristic of the alert.

7. The apparatus of claim 6, wherein the status indicator comprises a light-emitting device, and the characteristic of the alert comprises a first predetermined flash rate, wherein the processor-executable instructions that causes the processor to alter a characteristic of the alert comprises instructions that causes the processor to:

cause the alert to flash at a second predetermined flash rate.

8. The apparatus of claim 6, wherein the status indicator comprises a sound-emitting device, and the characteristic of the alert comprises a first predetermined chirp rate, wherein the processor-executable instructions that causes the processor to alter a characteristic of the alert comprises instructions that causes the processor to:

cause the alert to chirp at a second predetermined chirp rate.

9. The apparatus of claim 6, wherein the status indicator comprises a sound-emitting device, and the characteristic of the alert comprises a first predetermined chirp volume, wherein the processor-executable instructions that causes the processor to alter a characteristic of the alert comprises instructions that causes the processor to:

cause the alert to chirp at a second predetermined chirp volume.

10. The apparatus of claim 5, wherein the processor-executable instructions comprise further instructions that causes the processor to:

determine that the human being is no longer in proximity to the barrier; and in response to determining that the human being is no longer in proximity to the barrier, deactivate the status indicator.

11. A method, performed by a barrier alarm device, comprising:

monitoring a barrier internal barrier sensor of the barrier alarm;

receiving a status message from a security system controller, the status message indicating that a security system controlled by the security system controller is in an armed-home state;

in response to receiving the status message indicating that the security system is in an armed-home state, causing the status indicator to activate, providing an alert that the security system is armed; and causing an alarm signal to be transmitted when the internal barrier sensor indicates that the barrier has been moved.

12. The method of claim 11, wherein the status indicator comprises a light-emitting device, wherein activating the light-emitting device comprises:

causing the light-emitting device to flash at a first predetermined rate.

13. The method of claim 11, wherein the status indicator comprises a sound-emitting device, wherein activating the sound-emitting device comprises:

causing the sound-emitting device to emit a chirp.

14. The method of claim 11, further comprising:

determining a current time of day; and activating the status indicator only when the security system is in the armed home state and the current time of day is within a predetermined time period.

15. The method of claim 11, further comprising:

detecting that a human being is in proximity to the barrier; and causing the status indicator to activate only when the security system is in the armed-home state and the human being is detected as being in proximity to the barrier.

16. The method of claim 15, further comprising:

determining that the human being is closer to the barrier than from when the human being was initially detected; and in response to determining that the human being is closer to the barrier than from when the human being was initially detected, altering a characteristic of the alert.

17. The method of claim 16, wherein the status indicator comprises a light-emitting device, and the characteristic of the alert comprises a first predetermined flash rate, wherein altering a characteristic of the alert comprises:

causing the alert to flash at a second predetermined flash rate.

18. The method of claim 16, wherein the status indicator comprises a sound-emitting device, and the characteristic of the alert comprises a first predetermined chirp rate, wherein altering a characteristic of the alert comprises:

causing the alert to chirp at a second predetermined chirp rate.

19. The method of claim 16, wherein the status indicator comprises a sound-emitting device, and the characteristic of the alert comprises a first predetermined chirp volume, wherein altering a characteristic of the alert comprises:

causing the alert to chirp at a second predetermined chirp volume.

20. The method of claim 15, further comprising:

determining that the human being is no longer in proximity to the barrier; and in response to determining that the human being is no longer in proximity to the barrier, deactivating the status indicator.

* * * * *